US011919977B2

(12) United States Patent
Davidson et al.

(10) Patent No.: US 11,919,977 B2
(45) Date of Patent: Mar. 5, 2024

(54) PROCESS FOR PRODUCING CHLORINATED BUTYL RUBBER

(71) Applicant: ARLANXEO Singapore Pte. Ltd., Singapore (SG)

(72) Inventors: Gregory J. E. Davidson, London (CA); Kuruppu Jayatissa, London (CA)

(73) Assignee: ARLANXEO SINGAPORE PTE. LTD., Singapore (SG)

( * ) Notice: Subject to any disclaimer, the term of this patent is extended or adjusted under 35 U.S.C. 154(b) by 124 days.

(21) Appl. No.: 17/311,297

(22) PCT Filed: Dec. 12, 2019

(86) PCT No.: PCT/CA2019/051799
§ 371 (c)(1),
(2) Date: Jun. 4, 2021

(87) PCT Pub. No.: WO2020/132742
PCT Pub. Date: Jul. 2, 2020

(65) Prior Publication Data
US 2022/0017651 A1  Jan. 20, 2022

(30) Foreign Application Priority Data

Dec. 27, 2018  (EP) ..................................... 18248042

(51) Int. Cl.
*C08C 19/12* (2006.01)
*C08F 8/20* (2006.01)
*C08F 210/12* (2006.01)

(52) U.S. Cl.
CPC ............... *C08C 19/12* (2013.01); *C08F 8/20* (2013.01); *C08F 210/12* (2013.01); *C08F 2800/10* (2013.01); *C08F 2810/50* (2013.01)

(58) Field of Classification Search
CPC .......... C08C 19/12; C08F 8/20; C08F 210/12; C08F 2800/10; C08F 2810/50; C08F 210/10
See application file for complete search history.

(56) References Cited

U.S. PATENT DOCUMENTS

| | | | |
|---|---|---|---|
| 2,637,751 A | 5/1953 | Brooks et al. | |
| 2,944,578 A | 7/1960 | Baldwin et al. | |
| 2,948,709 A | 8/1960 | Kuntz et al. | |
| 2,964,493 A | 12/1960 | Hakala et al. | |
| 3,018,275 A | 1/1962 | Cottle | |
| 3,278,467 A * | 10/1966 | Burke | C08F 8/20 525/158 |
| 3,932,370 A | 1/1976 | Landi et al. | |
| 3,932,371 A * | 1/1976 | Powers | C08F 10/00 526/236 |
| 3,960,988 A | 6/1976 | Kent | |
| 4,245,060 A | 1/1981 | Powers | |
| 4,405,760 A * | 9/1983 | Howard, Jr. | C08F 8/20 525/330.7 |
| 4,501,859 A | 2/1985 | Newman | |
| 5,066,730 A | 11/1991 | Kennedy et al. | |
| 5,408,018 A | 4/1995 | Rath | |
| 5,569,723 A | 10/1996 | Baade et al. | |
| 5,670,582 A | 9/1997 | Chung et al. | |
| 5,674,955 A | 10/1997 | Kerr et al. | |
| 5,681,901 A | 10/1997 | Newman | |
| 5,886,106 A | 3/1999 | Sumner et al. | |
| 7,001,966 B2 | 2/2006 | Lang et al. | |
| 9,644,041 B2 | 9/2017 | Groemping et al. | |
| 2008/0227922 A1 | 9/2008 | Rath et al. | |
| 2013/0131281 A1 | 5/2013 | Gronowski et al. | |
| 2014/0134224 A1* | 5/2014 | Mallet | A61K 33/20 424/661 |
| 2014/0309362 A1 | 10/2014 | Leiberich et al. | |
| 2016/0312021 A1 | 10/2016 | Thompson et al. | |
| 2022/0017655 A1 | 1/2022 | Thompson | |
| 2022/0017658 A1 | 1/2022 | Murray | |
| 2022/0017659 A1 | 1/2022 | Murray | |
| 2022/0025084 A1 | 1/2022 | Murray | |

FOREIGN PATENT DOCUMENTS

| | | |
|---|---|---|
| CA | 1265891 A | 2/1990 |
| CA | 2787228 A1 | 7/2011 |
| CA | 2836521 A1 | 11/2012 |
| CA | 2934725 A1 | 7/2015 |
| EP | 0646103 B1 | 8/1997 |
| EP | 1215240 A1 | 6/2002 |

(Continued)

OTHER PUBLICATIONS

Co-pending U.S. Appl. No. 17/299,508, filed Jun. 3, 2021. (Published as US 2022/0025084).
Co-pending U.S. Appl. No. 17/299,608, filed Jun. 3, 2021. (Published as US 2022/0017658).
Co-pending U.S. Appl. No. 17/311,267, filed Jun. 4, 2021. (Published as US 2022/0017659).
Co-pending U.S. Appl. No. 17/311,857, filed Jun. 8, 2021. (Published as US 2022/0017655 A1).
International Search Report and Written Opinion, PCT Application No. PCT/CA2019/051834 dated Jun. 25, 2020.
International Search Report and Written Opinion, PCT Application No. PCT/CA2019/051835 dated Mar. 3, 2020.
International Search Report and Written Opinion, PCT Application No. PCT/CA2019/051836 dated Feb. 18, 2020.
International Search Report and Written Opinion, PCT Application No. PCT/CA2019/051799 dated Feb. 28, 2020.

(Continued)

*Primary Examiner* — Robert C Boyle
(74) *Attorney, Agent, or Firm* — The Dobrusin Law Firm, P.C.

(57) ABSTRACT

The invention relates to an energy efficient, fast and environmentally favourable process for the preparation of chlorinated butyl rubbers, that uses hypochlorous acid (HOCl) and/or dichlorine monoxide ($Cl_2O$) as halogenating agent. The process comprises reacting a copolymer with hypochlorous acid and/or dichlorine oxide. The copolymer comprises units derived from an isoolefin monomer and units derived from a multiolefin monomer. A preferred isoolefin is isobutene and a preferred multiolefin is isoprene.

24 Claims, 1 Drawing Sheet

(56) References Cited

FOREIGN PATENT DOCUMENTS

| EP | 1479724 | A1 | 11/2004 |
|---|---|---|---|
| EP | 2966097 | A1 | 1/2016 |
| GB | 839270 | A | 6/1960 |
| JP | H0297509 | A | 4/1990 |
| WO | 98/003562 | A1 | 1/1998 |
| WO | 2010/006983 | A1 | 1/2010 |
| WO | 2011/089091 | A1 | 7/2011 |
| WO | 2011/089092 | A1 | 7/2011 |
| WO | 2013/011017 | A1 | 1/2013 |
| WO | 2015/095961 | A1 | 7/2015 |
| WO | 2015/164964 | A | 11/2015 |
| WO | 2015/164965 | A | 11/2015 |
| WO | 2015/164966 | A1 | 11/2015 |
| WO | 2016/149802 | A | 9/2016 |

OTHER PUBLICATIONS

International Search Report and Written Opinion, PCT Application No. PCT/CA2019/051818 dated Mar. 19, 2020.
Rubber Technology, 3rd Ed., Edited by Maurice Morton, Kluwer Academic Publishers, pp. 297-300 or U.S. Pat. No. 5,886,106 issued Mar. 23, 1999.
Shiman, D.I. et al., "Cationic Polymerization of Isobutylene by AlCl3/Ether Complexes in Non-Polar Solvents: Effect of Ether Structure on the Selectivity of β-H Elimination". Polymer, Feb. 27, 2013, vol. 54 (9), pp. 2235-2242, ISSN 0032-3861. Section 3.1.2; Table 2.
Vasilenko, I.V. et al., "Cationic Polymeriztion of Isobutylene in Toluene:toward Well-Defined Exo-Olefin Terminated Medium Molecular Weight Polyisobutylenes under Mild Conditions". Polymer Chemistry, Jan. 23, 2017, vol. 8 (8), pp. 1417-1425, ISSN 1759-9962. p. 1422, right-hand side colume; Supplemental Information document, Table S3.
Kaszas, Bromination of Butyl Rubber in The Presence of Electrophilic Solvents and Oxidizing Agents, Rubber Chemistry and Technology, American Chemical Society, Rubber Division, vol. 73, No. 2, May 2000, pp. 356-365.
Extended European Search Report for EP Patent Application 19900382.3 (related to U.S. Appl. No. 17/311,267), dated Dec. 14, 2022.
Extended European Search Report dated Dec. 9, 2022, Application No. 19900153.8/3898714.
Extended European Search Report dated Dec. 13, 2022, Application No. 19901228.7/3898716.
Extended European Search Report dated Dec. 2, 2022, Application No. 19905971.8/3902845.
Extended European Search Report dated Oct. 13, 2022, Application No. 19899056.6/3898712.
Elias, Hans-Georg: "Makromolekule—Band 3: Industrielle Polymere und Synthesen", Wiley VCH, vol. 6, p. 175 (Broken up into 6 parts due to size) 5.2.10.
Mishra Munmaya K et al.: "Living Carbocationic Polymerization. VII. Living Polymerization of Isobutylene by Tertiary Alkyl (Or Aryl) Methyl Ether/Boron Trichloride Complexes", Journal of Macromolecular Science: Part A—Chemis, Marcel Dekker, New York, NY, US, vol. A24, No. 8, 1987, pp. 933-948, XP009156751, ISSN: 0022-233X, DOI: 10.1080/00222338708076927 (Broken up into 2 parts due to size).

* cited by examiner

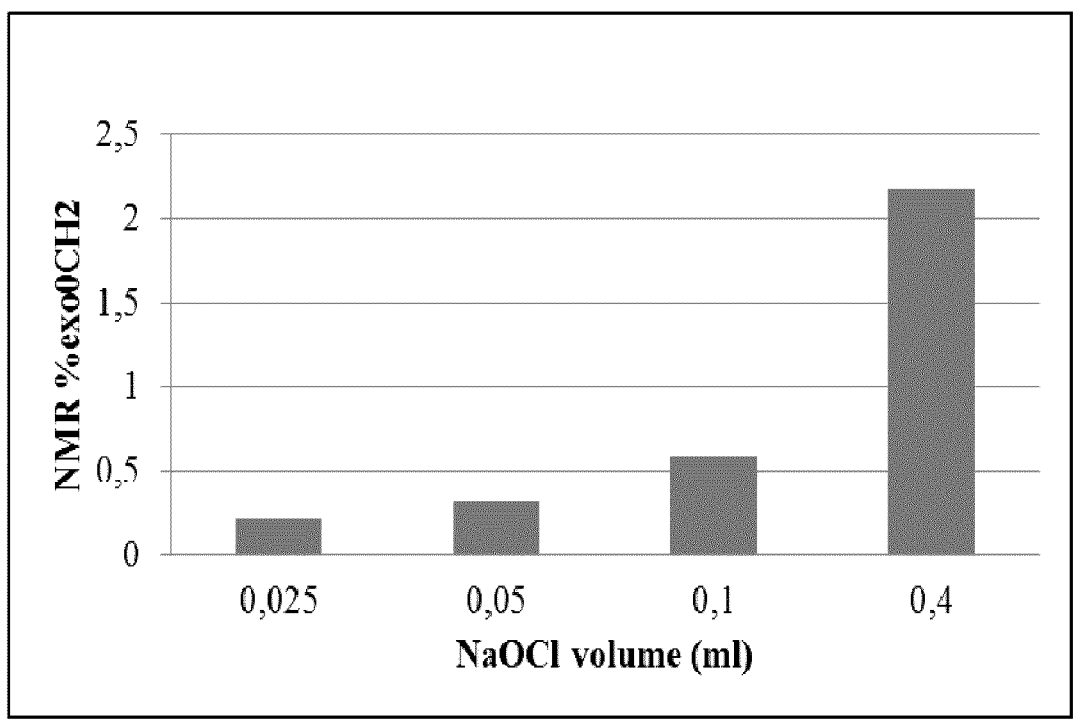

PROCESS FOR PRODUCING CHLORINATED BUTYL RUBBER

FIELD OF THE INVENTION

The invention relates to an energy efficient, fast and environmentally favourable process for the preparation of chlorinated butyl rubbers, that uses hypochloric acid (HOCl) and/or dichlorine monoxide ($Cl_2O$) as chlorinating agent. The chlorinated butyl rubbers prepared according to the aforementioned process exhibit an advantageous microstructure and a desirable content and ratio of chlorinated and non-chlorinated oligomers and are therefore also encompassed by the invention.

BACKGROUND

Butyl rubbers such as isobutene-isoprene rubber (also denoted as IIR) and their halogenated analogues are an important class of synthetic rubbers. As a result of its molecular structure, IIR possesses good air impermeability, a high loss modulus, oxidative stability and extended fatigue resistance.

The development of halogenated butyl rubber, in particular chlorinated butyl rubber, also referred to as chlorobutyl rubber (CIIR) and brominated butyl rubber, also referred to as bromobutyl rubber (BIIR) greatly extended the usefulness of butyl rubber by providing much higher curing rates and enabling co-vulcanization. Tire innerliners are by far the largest application for chloro and bromobutyl rubber. In addition to tire applications, chloro and bromobutyl rubber's good impermeability and stability make them good materials for pharmaceutical packaging, construction sealants and mechanical goods.

Chlorination of butyl rubber mainly produces four chlorinated microstructures which are depicted below:

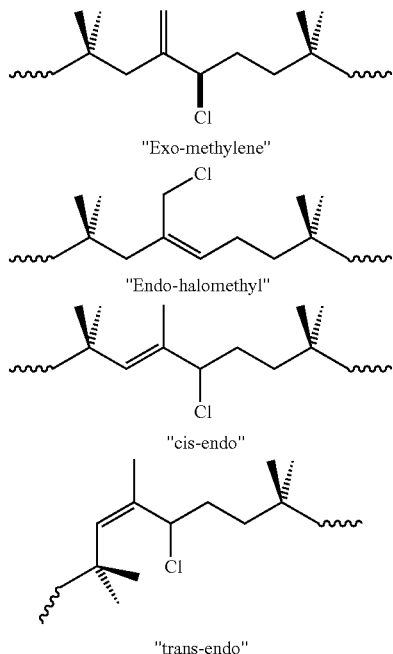

Due to their different reactivity in crosslinking a nucleophilic substitution reactions variability of the relative amounts of the aforementioned microstructures would be desirable. However, for conventional butyl rubber halogenation processes using chlorine as halogenating agent, the relative ratio of microstructures can only be influenced in a very narrow range.

Conventional butyl rubber halogenation processes are described in, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company © 1987), particularly pp. 297-300.

In the conventional process for producing chlorinated butyl rubber (also denoted as chlorobutyl rubber or CIIR) e.g. isobutene and isoprene are first polymerized in a polar halohydrocarbon medium, such as methyl chloride or 1,1,1,2-tetrafluoroethane with an aluminum based initiating system, typically aluminum trichloride ($AlCl_3$) or ethyl aluminum dichloride ($EtAlCl_2$) or diethyl aluminum chloride ($Et_2AlCl$) or a mixture of the latter which is often referred to as ethylaluminum-sesquichloride.

The butyl rubber does not appreciably dissolve in these polar media, but is present as suspended particles and so these processes are normally referred to as a slurry processes. Residual monomers and polymerization medium are then steam stripped from the butyl rubber, before it is dissolved in a chlorination medium, typically a non-polar medium such as hexane. The chlorination process ultimately produces the final chlorinated product. The conventional process therefore employs separate polymerization and chlorination steps employing two different media. The use of a polar medium for polymerization and a non-polar medium for chlorination necessitates intermediate stripping and dissolving steps. The step of separating the monomers and methyl chloride or 1,1,1,2-tetrafluoroethane from the butyl rubber is conducted before chlorination in order to avoid the formation of highly toxic byproducts from the reaction of chlorine with residual monomers.

U.S. Pat. No. 5,886,106 issued Mar. 23, 1999 describes a halogenated butyl rubber with a halogen content of 0.5-2.5% and a content of non-halogenated double bonds of greater than 0.7 mol %, but preferentially 0.7-1.0 mol % with an anti-agglomeration control agent (i.e. calcium stearate ($CaSt_2$)) in an amount of 1.25-2.2 wt %.

Alternatively, a common aliphatic solvent like a mixture of pentanes and hexanes is used for polymerization and halogenation as for examples disclosed in WO2010/006983A, WO2011/089092A which allows to omit the intermediate solvent exchange between polymerization and halogenation. The butyl rubber prepared during polymerization is dissolved in these aliphatic media and so these processes are normally referred to as a solution processes.

A common feature of the aforementioned processes is the use of elemental chlorine as halogenating agent which is toxic and thus requires substantial technical effort to handle it safely.

Irrespective of whether the polymerization is effected as a slurry or solution process cyclic oligomers 1-isopropenyl-2,2,4,4-tetramethylcyclohexane, hereinafter referred to as C13 and 1,1,5,5-tetramethyl-2-(1-methylethenyl)-3-(2,2,4-trimethylpentyl)-cyclohexane, hereinafter referred to as C21 are produced as by-product and remain within the butyl rubber. For some commercial products cyclic oligomer levels of around 2500 ppm were measured.

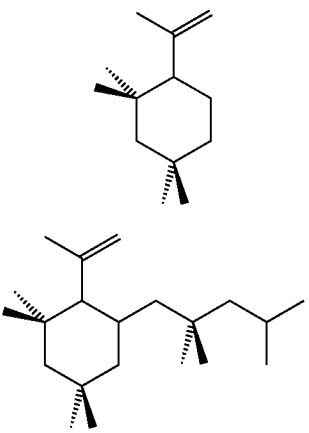

C13

C21

These cyclic oligomers are unsaturated, and chlorination of butyl rubber according to conventional procedures using chlorine as chlorinating agent also results in almost exhaustive chlorination of the cyclic oligomers C13 and C21 yielding the following compounds, abbreviated as C1-C13 and C1-C21, and isomers thereof:

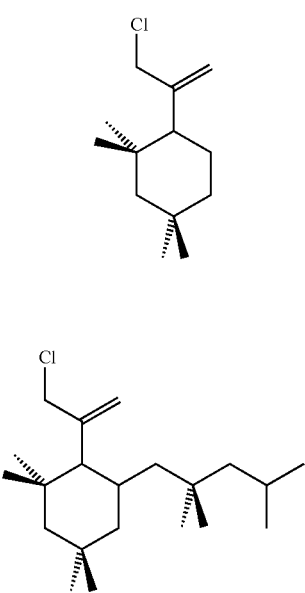

Cl-C13

Cl-C21

Especially the halogenated cyclic oligomers C1-13 and C1-C21 are undesirable in certain applications, for example in pharmaceutical seals, closures, blood collection stoppers, medical devices and food grade applications, due to the potential for the halogenated cyclic oligomers to migrate into/onto the pharmaceutical or food product, and then interact or react with the product and/or be introduced into a patient. Therefore, a reduction in halogenated cyclic oligomer levels in chlorinated butyl rubber is highly desirable.

As a consequence there remains a need to provide an efficient and safe chlorination process for butyl rubber that preferably also allows to vary the microstructure of the chlorinated butyl rubber and chlorination behaviour of cyclic oligomers.

SUMMARY OF THE INVENTION

There is now provided a process for the preparation of a chlorinated copolymer comprising at least the step of reacting a copolymer with hypochloric acid (HOCl) and or dichlorine oxide ($Cl_2O$).

There is further provided a chlorinated copolymer comprising at least
  i) structural units derived from at least one isoolefin monomer and
  ii) structural units derived from isoprene
wherein the halogenated copolymer exhibits a specific microstructure.

The invention further encompasses polymer products in particular blends and compounds comprising the aforementioned chlorinated copolymers as well as cured articles made from such polymer products, blends and compounds.

BRIEF DESCRIPTION OF THE DRAWINGS

FIG. 1 depicts a graph of exo-CH2-contents (%) versus amount (ml) of sodium hypochlorite solution used in a chlorination process.

Further features will be described or will become apparent in the course of the following detailed description. It should be understood that each feature described herein may be utilized in any combination with any one or more of the other described features, and that each feature does not necessarily rely on the presence of another feature except where evident to one of skilled in the art.

DETAILED DESCRIPTION

There is now provided a process for the preparation of a chlorinated copolymer comprising at least the step of reacting a copolymer with hypochloric acid (HOCl) and/or dichlorine oxide ($Cl_2O$).

As used herein then term "copolymer" denotes copolymers comprising at least
  i) structural units derived from at least one isoolefin monomer and
  ii) structural units derived from at least one multiolefin monomer As used herein the term isoolefins denotes compounds comprising one carbon-carbon-double-bond, wherein one carbon-atom of the double-bond is substituted by two alkyl-groups and the other carbon atom is substituted by two hydrogen atoms or by one hydrogen atom and one alkyl-group.

Examples of suitable isoolefins include isoolefin monomers having from 4 to 16 carbon atoms, preferably 4 to 7 carbon atoms, such as isobutene, 2-methyl-1-butene, 3-methyl-1-butene, 2-methyl-2-butene. A preferred isolefin is isobutene.

As used herein the term multiolefin denotes compounds comprising more than one carbon-carbon-double-bond, either conjugated or non-conjugated, preferably conjugated.

Examples of suitable multiolefins include isoprene, butadiene, 2-methylbutadiene, 2,4-dimethylbutadiene, piperylene, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene and 1-vinyl-cyclohexadiene.

Preferred multiolefins are isoprene and butadiene. Isoprene is particularly preferred.

The copolymers used for chlorination may further comprise further structural units derived from olefins which are neither isoolefins nor multiolefins.

Examples of such suitable olefins include β-pinene, styrene, divinylbenzene, diisopropenylbenzene o-, m- and p-alkylstyrenes such as o-, m- and p-methyl-styrene.

In another embodiment the copolymers used for chlorination does not comprise structural units derived from olefins which are neither isoolefins nor multiolefins.

The content of structural units derived from multiolefins of the copolymer is typically 0.1 mol-% or more, preferably of from 0.1 mol-% to 15 mol-%, in another embodiment 0.5 mol-% or more, preferably of from 0.5 mol-% to 10 mol-%, in another embodiment 0.7 mol-% or more, preferably of from 0.7 to 8.5 mol-% in particular of from 0.8 to 1.5 or from 1.5 to 2.5 mol-% or of from 2.5 to 4.5 mol-% or from 4.5 to 8.5 mol-%, particularly where isobutene and isoprene are employed. As used herein mol-% refers to the molar amount of structural units based on the monomers said structural units are derived from.

The copolymer is reacted with hypochloric acid (HOCl) and/or dichlorine oxide ($Cl_2O$).

In one embodiment the reaction is carried out by contacting an aqueous phase comprising hypochloric acid (HOCl) and/or dichlorine oxide ($Cl_2O$) with an organic phase comprising the copolymer and an organic diluent.

Hypochloric acid (HOCl) and or dichlorine oxide ($Cl_2O$) may and are preferably prepared by reacting hypochlorites like alkali or earth alkali hypochlorites with acidic compounds having a pKa of 0.00 to 7.60, preferably from 0.50 to 7.00, more preferably 1.00 to 6.00 and more preferably 1.50 to 5.50 and even more preferably 2.50 to 5.00 as measured at standard conditions.

Such compounds include acids and acidic salts.

Suitable acids include organic acids such as carboxylic acids like acetic acid, propionic acid, malic acid, maleic acid, tartaric acid, citric acid, oxalic acid, succinic acid, benzoic acid, salicylic acid, m-chlorobenzoic acid; sulfonic acids such as toluenesulfonic acid Suitable acids further include inorganic acids such as phosphoric acid, carbonic acid (typically employed as carbon dioxide or aqueous solutions thereof).

Suitable acidic salts include dihydrogenphosphates like sodium hydrogenphosphate, hydrogensulphates like sodium hydrogensulphate and citrates like monosodium citrate.

A preferred hypochlorite is sodium hypochlorite which is typically employed as aqueous solution with a content of from 0.1 to 15 wt.-%, preferably 1 to 5 wt.-%. Such solutions are commercially available with varying contents as Eau de Javel or household bleach.

In one embodiment solutions of sodium hypochlorite are prepared by electrolysis of sodium chloride solutions e.g. directly before use.

Upon reaction of hypochlorites with the acidic compounds defined above, hypochlorous acid (HOCl) is formed which is in equilibrium with dichlorine oxide ($Cl_2O$). The reactions are exemplified with acetic acid and proceed according to the following equations (I) and (II):

$$NaOCl + HOAc \rightarrow NaOAc + HOCl \quad \text{(I)}$$

$$2HOCl \leftrightarrow Cl_2O + H_2 \quad \text{(II)}$$

It was found that the application of stronger acids having a pKa of below 0.00 such as hydrochloric acid or sulfuric acid does not lead to hypochlorous acid or dichlorine oxide but to formation of elemental chlorine ($Cl_2$) according to equations (III) and (IV)

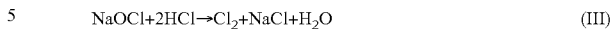

$$NaOCl + 2HCl \rightarrow Cl_2 + NaCl + H_2O \quad \text{(III)}$$

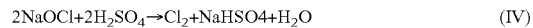

$$2NaOCl + 2H_2SO_4 \rightarrow Cl_2 + NaHSO4 + H_2O \quad \text{(IV)}$$

In one embodiment the aqueous phase comprising hypochloric acid (HOCl) and/or dichlorine oxide ($Cl_2O$) exhibits a pH value of from 2.0 to 7.4, preferably from 2.5 to 7.0 and more preferably from 4.0 to 6.5 under reaction conditions.

Preferably, the amount of hypochlorite solution employed is in the range of from about 0.1 to about 20%, preferably in the range of 0.1 to 15%, even more preferably from about 0.5% to about 6%, yet even more preferably from about 1.0% to about 5%, even still more preferably from about 1.5% to about 4.5% by weight of the copolymer employed. Preferably, the amount of acidic compound employed is in the range of from about 0.1 to 5.0, more preferably 1.0 to -4.0, and even more preferably 1.0 to 3.0 per mol of hypochlorite employed.

The organic phase comprises the copolymer and a diluent. The concentration of copolymer within the organic phase employed in the reaction is for example between 0.1 and 50 wt.-% of the organic phase, preferably 5 to 25 wt.-% and more preferably 12 to 22 wt.-%

The term organic diluent encompasses organic chemicals or mixtures of at least two organic chemicals which are liquid under process conditions and are capable of dissolving the copolymer employed in the reaction.

Preferred examples of organic diluents include hydrocarbons, like alkanes which in a further preferred embodiment include propane, isobutane, pentane, methycyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,2,4,-trimethylpentane, octane, heptane, butane, decane, dodecane, undecane, hexane, methyl cyclohexane, cyclopropane, cyclobutane, cyclopentane, methylcyclopentane, 1,1-dimethylcycopentane, cis-1,2-dimethylcyclopentane, trans-1,2-dimethylcyclopentane, trans-1,3-dimethyl-cyclopentane, ethylcyclopentane, cyclohexane, methylcyclohexane and like aromatic hydrocarbons which in a further preferred embodiment include toluene and xylenes.

Examples of organic diluents further include hydrochlorocarbons, preferably halogenated alkanes such as dichloromethane.

Examples of organic diluents further include ethers such as tetrahydrofurane, methyltetrahydrofurane, dioxane and ethyleneglycol diethylether.

The organic phase may be prepared by dissolving a copolymer e.g. obtained from commercial sources in the organic diluent, or by solvent replacement as disclosed in U.S. Pat. No. 5,021,509, which is herein incorporated by reference. In another embodiment the organic phase employed in the reaction according to the invention is prepared in process comprising at least the steps of A) providing a reaction medium comprising
    an aliphatic medium comprising at least 50 wt.-% of one or more aliphatic hydrocarbons having a boiling point in the range of 45° C. to 80° C. at a pressure of 1013 hPa, and a monomer mixture comprising at least one isoolefin, at least one multiolefin and either no, one or more than one further olefin which are neither isoolefins nor multiolefins.
in a mass ratio of monomer mixture to aliphatic medium of from 35:65 to 99:1, preferably from 50:50 to 85:15 and even more preferably from 61:39 to 80:20;
B) polymerizing the monomer mixture within the reaction medium in the presence of an initiator to form a product medium comprising the copolymer, the aliphatic medium and residual monomers of the monomer mixture;
C) removing residual monomers of the monomer mixture from the product medium to obtain the organic phase, whereby the separation is preferably performed by distillation.

The specific ratio of isoolefins and multiolefins used in step A) to obtain the copolymer depends on several factors such as temperature and initiator employed in step A) and the desired level of multiolefin in the final copolymer but may be easily determined by very few routine experiments or is known from the vast amount of literature known for this task.

The polymerization in B) is initiated by an initiator. Such initiators include but are not limited to reaction products of
at least one lewis acid such as aluminum trihalides such as aluminium trichloride, titanium halides such as titanium tetrachloride, stannous halides such as stannous tetrachloride, boron halides such as boron trifluoride and boron trichloride, antimony halides such as antimony pentachloride or antimony pentafluoride or at least one organometal compound such as dialkylaluminum halides such as diethylaluminum chloride, alkylaluminum dihalides such as ethylaluminum dichloride or a mixture of the aforementioned lewis acids and/or organometal compounds and
at least one proton source such as water, alcohols such as $C_1$ to $C_{12}$ aliphatic alcohols like methanol, ethanol or isopropanol, phenols, carboxylic acids, sulfonic acids, thiols or inorganic acids such as dihydrogensulfide, hydrogen chloride, hydrogen bromide or sulphuric acid
carbocationic compounds of formula (I)

$$[CR^1R^2R^3]^+An^-  \qquad (I)$$

wherein $R^1$, $R^2$ and $R^3$ are independently hydrogen, $C_1$-$C_{20}$-alkyl or $C_5$-$C_{20}$-aryl with the proviso that either one or none of $R^1$, $R^2$ and $R^3$ is hydrogen and
$An^-$ denotes a monoanion or 1/p equivalent of a p-valent anion
or
silylium compounds of formula (II)

$$[SiR^1R^2R^3]^+An^-  \qquad (II)$$

wherein $R^1$, $R^2$ and $R^3$ and $An^-$ have the same meaning as set forth above for formula (I)
or mixtures of the aforementioned compounds and reaction products The preferred molar ratio of lewis acids or organometal compounds and the proton sources is in the range of from 1:0.0001 to 1:5, preferably from 1:0.5 to 1:3 and more preferably from 1:0.5 to 1:2.

In formulae (I) and (II) $R^1$, $R^2$ and $R^3$ are preferably independently selected from the group consisting of phenyl, tolyl, xylyl and biphenyl, methyl, ethyl, n-propyl, n-butyl, n-pentyl, n-hexyl, cyclohexyl, n-octyl, n-nonyl, n-decyl, n-dodecyl, 3-methylpentyl and 3,5,5-trimethylhexyl.

In formulae (I) and (II) $An^-$ preferably denote an anion of formula (III)

$$[M(R^4)_4]^-  \qquad (III)$$

wherein
M is boron, aluminum, gallium or indium in the +3 formal oxidation state and
$R^4$ is independently, more preferably identically, selected from the group consisting of hydride, dialkylamido, halide such as chloride, $C_1$-$C_{20}$-alkyl or $C_5$-$C_{20}$-aryl, $C_1$-$C_{20}$-haloalkyl or $C_5$-$C_{20}$-haloaryl.

Preferred cationic initiators are
reaction products of
at least one lewis acid such as aluminum trihalides such as aluminium trichloride, titanium halides such as titanium tetrachloride, stannous halides such as stannous tetrachloride, boron halides such as boron trifluoride and boron trichloride, antimony halides such as antimony pentachloride or antimony pentafluoride or at least one organometal compound such as dialkylaluminum halides such as diethylaluminum chloride, alkylaluminum dihalides such as ethylaluminum dichloride or a mixture of the aforementioned lewis acids and/or organometal compounds and
at least one proton source such as water, alcohols such as $C_1$ to $C_{12}$ aliphatic alcohols such as methanol, ethanol and isopropanol, phenols, carboxylic acids, sulfonic acids, thiols or inorganic acids such as dihydrogensulfide, hydrogen chloride, hydrogen bromide or sulphuric acid as cationic initiator and More preferred cationic initiators are reaction products of diethylaluminum chloride or ethylaluminum dichloride or mixtures thereof with at least one proton source such as water, alcohols such as $C_1$ to $C_{12}$ aliphatic alcohols like methanol, ethanol and isopropanol, phenols, carboxylic acids, thiols or inorganic acids such as dihydrogensulfide, hydrogen chloride, hydrogen bromide or sulphuric acid is used, whereby water and hydrogenchloride are even more preferred and water is particularly preferred.

The preferred molar ratio of diethylaluminum chloride or ethylaluminum dichloride or mixtures thereof with such proton sources or preferably hydrogen chloride and water and more preferably water is in the range of from 1:0.01 to 1:3, more preferably from 1:0.5 to 1:2.

Particulary preferred cationic initiators are reaction products of mixtures of diethylaluminum chloride and ethylaluminum dichloride, in particular the 1:1 molar mixture which is also called ethylaluminum sesquichloride with hydrogen chloride or water, preferably water, whereby amount of water or hydrogen chloride to aluminium is between 50 and 200 mol-%.

The polymerization initiators comprising diethylaluminum chloride and ethylaluminum dichloride are typically and preferably employed as 0.5-10 wt % solution in hexane in an amount of from 0.0001 to 20 wt.-%, more preferably 0.01 to 10 wt.-% and even more preferably 0.05 to 5 wt.-% of the reaction medium employed in step A).

In general the polymerization initiators are preferably employed in an amount of from 0.0001 to 20 wt.-%, more preferably 0.01 to 10 wt.-% and even more preferably 0.02 to 5 wt.-% of the reaction medium employed in step A).

In one embodiment, the process temperature of step B) is in the range of −100° C. to −40° C., preferably in the range of −95° C. to −60° C., more preferably in the range of −80° C. to −60° C.

The halogenation reaction according to the invention may be further carried out in the presence of an antioxidant to avoid or at least reduce chain scission.

Suitable antioxidants generally include 2,4,6-tri-tert-butylphenol, 2,4,6 tri-isobutylphenol, 2-tert-butyl-4,6-dimethylphenol, 2,4-dibutyl-6-ethylphenol, 2,4-dimethyl-6-tert-butylphenol, 2,6-di-tert-butylhydroyxytoluol (BHT), 2,6-di-tert-butyl-4-ethylphenol, 2,6-di-tert-butyl-4-n-butylphenol, 2,6-di-tert-butyl-4-iso-butylphenol, 2,6-dicyclopentyl-4-methylphenol, 4-tert-butyl-2,6-dimethylphenol, 4-tert-butyl-2,6-dicyclopentylphenol, 4-tert-butyl-2,6-diisopropylphenol, 4,6-di-tert-butyl-2-methylphenol, 6-tert-butyl-2,4-dimethylphenol, 2,6-di-tert-butyl-3-methylphenol, 2,6-di-tert-butyl-4-phenylphenol and 2,6-dioctadecyl-4-methylphenol, 2,2'-ethylidene-bis [4,6-di-tert.-butylphenol], 2,2'-ethylidene-bis [6-tert.-butyl-4-isobutylphenol], 2,2'-isobutylidene-bis [4,6-dimethyl-phenol], 2,2-methylene-bis [4,6-di-tert.-butylphenol], 2,2'-methylene-bis [4-methyl-6-($\alpha$-methylcyclohexyl)phenol], 2,2'-methylene-bis [4-methyl-6-cyclohexylphenol], 2,2'-methylene-bis [4-methyl-6-nonylphenol], 2,2-methylene-bis [6-(a, a'-dimethylbenzyl)-4-nonylphenol], 2,2-methylene-bis [6-($\alpha$-methylbenzyl)-4-nonylphenol], 2,2'-methylene-bis [6-cyclohexyl-4-methylphenol], 2,2'-methylene-bis [6-tert.-butyl-4-ethylphenol], 2,2'-methylene-bis [6-tert.-butyl-4-methylphenol], 4,4-butylidene-bis [2-tert.-butyl-5-methylphenol], 4,4'-methylene-bis [2,6-di-tert.-butylphenol], 4,4'-methylene-bis [6-tert.-butyl-2-methylphenol],4,4-isopropylidene-diphenol, 4,4'-decylidene-bisphenol, 4,4'-dodecylidene-bisphenol, 4,4'-(1-methyloctylidene)bisphenol, 4,4'-cyclohexylidene-bis(2-methylphenol), 4,4'-cyclohexylidenebisphenol, and pentaerythrol-tetrakis-[3-(3,5-di-tert.-butyl-4-hydroxyphenyl)-propanoic acid (also known as Irganox® 1010).

The reaction, in particular where it is effected by contacting an aqueous phase comprising hypochloric acid (HOCl) and/or dichlorine oxide (Cl$_2$O) with an organic phase comprising the copolymer and an organic diluent can be performed in any vessel suitable for this purpose. In industry such reaction may be performed e.g. in a stirred tank or in a column or flow-through reactor equipped with static mixing elements and/or active mixing devices such as stirrers.

The reaction, i.e. the chlorination of the copolymer may be operated at a temperature of from −5° C. to 80° C., preferably from 0° C. to 60° C. and even more preferably of from 5 to 35° C.

It was observed that the reaction proceeds very fast. Thus the reaction time may be from 1 to 30 minutes, preferably from 3 to 20 minutes. A longer reaction time is possible but of no benefit.

The pressure during chlorination may be from 0.5 to 10 bar, preferably from 0.8 to 2 bar, ambient pressure is even more preferred.

The level of chlorination during this procedure may be controlled so that the final chlorinated copolymer has the preferred contents of chlorine described hereinabove.

A major finding of the invention is that hypochloric acid (HOCl) and/or dichlorine oxide (Cl$_2$O) react with the copolymer under very mild conditions fast and efficiently thereby producing halogenated copolymer.

Where the reaction is effected by contacting an aqueous phase comprising hypochloric acid (HOCl) and/or dichlorine oxide (Cl$_2$O) with an organic phase comprising the copolymer and an organic diluent the rate of reaction and or the conversion can be enhanced by intense mixing in order to increase the interphase and thus the migration of hypochloric acid (HOCl) and/or dichlorine oxide (Cl$_2$O) as chlorinating agent into the organic phase.

In one embodiment the mechanical power input is 0.5 W/l of the reaction medium (i.e the aqueous phase and the organic phase) or above, preferably 0.7 W/l or above, for example 0.7 to 50 W/l, preferably 1.0 to 20 W/l.

The mechanical power input of stirrers and mixers can for example be determined by measuring the electrical power consumption at a certain rotational speed once in the reaction medium and once in air and taking the difference.

In a preferred embodiment the halogenation reaction is carried out continuously for example using a commonly known flow-through reactors.

As a result of the reaction a halogenated copolymer is obtained. The halogenated copolymer may then be isolated halogenated by conventional measures.

In one embodiment the isolation is effected by separating the organic phase after adjusting the pH-value of the aqueous phase to 6.0 to 11.0 and preferably to 9 to 10.

After phase separation the halogenated copolymer is the obtained by either batchwise or more commonly in industry continually transferring the separated organic phase into a steam-stripper wherein the aqueous phase comprises an anti-agglomerant which either is a fatty acid salt of a multivalent metal ion, in particular either calcium stearate or zinc stearate or an LCST compound in order to form and preserve particles of halogenated copolymers, which are more often referred to as "halobutyl rubber crumb". Said particles are then dried, baled and packed for delivery.

The anti-agglomerant ensures that the particles of the halogenated copolymer stay suspended and show a reduced tendency to agglomerate.

As used herein the term LCST compound covers all compounds where a cloud point of 0 to 100° C., preferably 5 to 100° C., more preferably 15 to 80° C. and even more preferably 20 to 80° C. can be determined by at least one of the following methods:
1) DIN EN 1890 of September 2006, method A
2) DIN EN 1890 of September 2006, method C
3) DIN EN 1890 of September 2006, method E
4) DIN EN 1890 of September 2006, method A wherein the amount of compound tested is reduced from 1 g per 100 ml of distilled water to 0.05 g per 100 ml of distilled water.
5) DIN EN 1890 of September 2006, method A wherein the amount of compound tested is reduced from 1 g per 100 ml of distilled water to 0.2 g per 100 ml of distilled water.

For more details reference is made to WO2015/095961 which is incorporated herein in its entirety.

Alternatively, after phase separation the halogenated copolymer is obtained by coagulation or evaporating the solvent using kneaders or extruders as disclosed in WO2010/031823 or
WO2011/117280 which are incorporated herein in their entirety.

It was found that the novel halogenation pathway allows to obtain chlorinated copolymers with a desirable microstructure that was never observed before. It was further observed that hypochloric acid and dichlorine oxide convert cyclic oligomers into their halogenated analogous to a much lesser extent than ever observed before.

Therefore a further aspect of the invention relates to a chlorinated copolymer comprising at least
i) structural units derived from at least one isoolefin monomer and ii) structural units derived from isoprene
wherein the
the chlorine content of the copolymer is from 0.1 to 4 wt.-%, preferably from 0.5 to 2.5 wt.-% and even more preferably from 1.0 to 2.2 wt.-%.
the structural units derived from isoprene are at least partially chlorinated to form exo-methylene and endo-Cl and cis-endo and trans-endo and microstructure units such that the microstructure Index X being the ratio of mol-% (exo-methylene+endo-Cl)/mol-% (cis-endo and trans-endo)
as measured by $^1$H-NMR is from 1.50 to 3.30, preferably from 2.00 to 3.00 and even more preferably from 2.20 to 2.80.

Yet another aspect of the invention relates to a chlorinated copolymer comprising at least
i) structural units derived from isobutene and
ii) structural units derived from isoprene
wherein
the chlorine content of the copolymer is from 0.1 to 4 wt.-%, preferably from 0.5 to 2.5 wt.-% and even more preferably from 1.0 to 2.2 wt.-%.
the copolymer comprises 1-(1-chloromethylethenyl)-2,2,4,4-tetramethylcyclohexane (C1-C13) and 1,1,5,5-tetramethyl-2-(1-chloromethylethenyl)-3-(2,2,4-trimethylpentyl)-cyclohexane (C1-C21) in an amount of together 1000 ppm or less and/or in a ratio (C1-C13)/(C1-C21) of 0.60 or more, preferably from 0.60 to 50.00, preferably from 0.80 to 30.0, more preferably from 1.00 to 10.00 and yet even more preferably from 1.50 to 5.00.

If not mentioned otherwise the chlorine content is measured using x-ray fluorescence (XRF).

The microstructure units by $^1$H-NMR and the calculation of the microstructure Index X can be determined using conventional methods as for example published in Chia Yeh Chu, Kenneth Norman
Watson, and Rastko Vukov (1987), "Determination of the Structure of Chlorobutyl and Bromobutyl Rubber by NMR Spectroscopy", Rubber Chemistry and Technology: September 1987, Vol. 60, No. 4, pp. 636-646.

If not mentioned otherwise the content of C13, C1-C13, C21 and C1-C21 is determined by GC-FID. All levels mentioned herein were measured using an Agilent 6890 Series Plus gas chromatograph equipped with an Agilent J+W VF lms 30×0.25 (1.0) column (inlet 275° C., 22 psi) and an FID temperature of 300° C. equipped with a HP 7683 Series auto injector.

The content of structural units derived from multiolefins of the halogenated copolymer is typically 0.1 mol-% or more, preferably of from 0.1 mol-% to 15 mol-%, in another embodiment 0.5 mol-% or more, preferably of from 0.5 mol-% to 10 mol-%, in another embodiment 0.7 mol-% or more, preferably of from 0.7 to 8.5 mol-% in particular of from 0.8 to 1.5 or from 1.5 to 2.5 mol-% or of from 2.5 to 4.5 mol-% or from 4.5 to 8.5 mol-%, particularly isoprene is the multiolefin. As used herein mol-% refers to the molar amount of structural units based on the monomers said structural units are derived from.

For the avoidance of doubt even though the halogenation further modifies the structural units derived from a multiolefin, both the non-halogenated structural units and the halogenated structural units originally derived from isoprene are encompassed by the term "content of structural units derived from multiolefins".

In one embodiment the halogenated copolymer comprises 0.1 mol-% or more structural units derived from at least one multiolefin and 99.9 mol-% or less structural units derived from at least one isoolefin.

Preferably the halogenated copolymer comprises 0.1 mol-% to 15 mol-%, preferably from 0.5 mol-% to 10 mol-% and more preferably from 1.0 to 3.0 mol % structural units derived from at least one multiolefin and from 85 to 99.9 mol.-%, preferably from 90 mol-% to 99.5 mol-% and more preferably from 97.0 to 99.0 mol % structural units derived from at least one isoolefin.

In one embodiment, the mass average molecular weight of the halogenated copolymer Mw is between 30,000 and 2,000,000 g/mol, preferably between 50,000 and 1,000,000 g/mol more preferably between 300.000 and 1,000,000 g/mol and even more preferably from 350,000 to 600,000 g/mol, yet more preferably 375,000 to 550,000 g/mol and most preferably 400,000 to 500,000 g/mol. If not mentioned otherwise, molecular weights are obtained using gel permeation chromatography in tetrahydrofuran (THF) solution using polystyrene molecular weight standards.

In one embodiment the polydispersity of the halogenated copolymer according to the invention is in the range of 1.5 to 4.5 as measured by the ratio of weight average molecular weight to number average molecular weight as determined by gel permeation chromatography.

The halogenated copolymer for example and typically has a Mooney viscosity of at least 10 (ML 1+8 at 125° C., ASTM D 1646), preferably of from 10 to 80, more preferably of from 20 to 80 and even more preferably of from 25 to 60 (ML 1+8 at 125° C., ASTM D 1646).

One further aspect of the invention relates to polymer products such as blends and compounds comprising the aforementioned chlorinated copolymers as well as cured articles made from such polymer products, blends and compounds. Due to their unique microstructure the halogenated polymers and as well as their blends and compounds exhibit a desirous curing behavior.

The halogenated copolymers according to the invention may be blended either with each other or additionally or alternatively with at least one secondary rubber being different from the halogenated copolymers, which is preferably selected from the group consisting of natural rubber (NR), epoxidized natural rubber (ENR), polyisoprene rubber, poly (styrene-co-butadiene) rubber (SBR), chloroprene rubber (CR), polybutadiene rubber (BR), perfluorohalogenated elastomer (FFKM/FFPM), ethylene vinylacetate (EVA) rubber, ethylene acrylate rubber, polysulphide rubber (TR), poly(isoprene-co-butadiene) rubber (IBR), styrene-isoprene-butadiene rubber (SIBR), ethylene-propylene rubber (EPR), ethylene-propylene-diene M-class rubber (EPDM), polyphenylensulfide, nitrile-butadiene rubber (NBR), hydrogenated nitrile-butadiene rubber (HNBR), propylene oxide polymers, star-branched butyl rubber and halogenated star-branched butyl rubber, butyl rubbers which are not subject of the present invention i.e. having i.a. different levels of multivalent metal ions or purity grages, star-branched polyisobutylene rubber, star-branched brominated butyl (polyisobutylene/isoprene halogenated elastomer) rubber; poly(isobutylene-co-p-methylstyrene) and halogenated poly(isobutylene-co-p-methylstyrene), poly(isobutylene-co-isoprene-co-styrene), poly(isobutylene-co-isoprene-co-alpha-methylstyrene), halogenated poly(isobutylene-co-isoprene-co-a-methylstyrene).

One or more of the halogenated copolymers according to the invention or the blends with secondary rubbers described above may be further blended additionally or alternatively for example simultaneously or separately with at least one thermoplastic polymer, which is preferably selected from the group consisting of polyurethane (PU), polyacrylic esters (ACM, PMMA), thermoplastic polyester urethane (AU), thermoplastic polyether urethane (EU), perfluoroalkoxyalkane (PFA), polytetrafluoroethylene (PTFE), and polytetrafluoroethylene (PTFE).

One or more of the halogenated copolymers according to the invention or the blends with secondary rubbers and/or thermoplastic polymers described above may be compounded with one or more fillers. The fillers may be non-mineral fillers, mineral fillers or mixtures thereof. Non-mineral fillers are preferred in some embodiments and include, for example, carbon blacks, rubber gels and mixtures thereof. Suitable carbon blacks are preferably prepared by lamp black, furnace black or gas black processes. Carbon blacks preferably have BET specific surface areas of 20 to 200 $m^2/g$. Some specific examples of carbon blacks are SAF, ISAF, HAF, FEF and GPF carbon blacks. Rubber gels are preferably those based on polybutadiene, butadiene/styrene halogenated elastomers, butadiene/acrylonitrile halogenated elastomers or polychloroprene.

Suitable mineral fillers comprise, for example, silica, silicates, clay, bentonite, vermiculite, nontronite, beidelite, volkonskoite, hectorite, saponite, laponite, sauconite, magadiite, kenyaite, ledikite, gypsum, alumina, talc, glass, metal oxides (e.g. titanium dioxide, zinc oxide, magnesium oxide, aluminum oxide), metal carbonates (e.g. magnesium carbonate, calcium carbonate, zinc carbonate), metal hydroxides (e.g. aluminum hydroxide, magnesium hydroxide) or mixtures thereof.

Dried amorphous silica particles suitable for use as mineral fillers may have a mean agglomerate particle size in the range of from 1 to 100 microns, or 10 to 50 microns, or 10 to 25 microns. In one embodiment, less than 10 percent by volume of the agglomerate particles may be below 5 microns. In one embodiment, less than 10 percent by volume of the agglomerate particles may be over 50 microns in size. Suitable amorphous dried silica may have, for example, a BET surface area, measured in accordance with DIN (Deutsche Industrie Norm) 66131, of between 50 and 450 square meters per gram. DBP absorption, as measured in accordance with DIN 53601, may be between 150 and 400 grams per 100 grams of silica. A drying loss, as measured according to DIN ISO 787/11, may be from 0 to 10 percent by weight. Suitable silica fillers are commercially sold under the names HiSil™ 210, HiSil™ 233 and HiSil™ 243 available from PPG Industries Inc. Also suitable are Vulkasil™ S and Vulkasil™ N, commercially available from Bayer AG.

High aspect ratio fillers useful in the present invention may include clays, talcs, micas, etc. with an aspect ratio of at least 1:3. The fillers may include acircular or nonisometric materials with a platy or needle-like structure. The aspect ratio is defined as the ratio of mean diameter of a circle of the same area as the face of the plate to the mean thickness of the plate. The aspect ratio for needle and fiber shaped fillers is the ratio of length to diameter. The high aspect ratio fillers may have an aspect ratio of at least 1:5, or at least 1:7, or in a range of 1:7 to 1:200. High aspect ratio fillers may have, for example, a mean particle size in the range of from 0.001 to 100 microns, or 0.005 to 50 microns, or 0.01 to 10 microns. Suitable high aspect ratio fillers may have a BET surface area, measured in accordance with DIN (Deutsche Industrie Norm) 66131, of between 5 and 200 square meters per gram. The high aspect ratio filler may comprise a nanoclay, such as, for example, an organically modified nanoclay. Examples of nanoclays include natural powdered smectite clays (e.g. sodium or calcium montmorillonite) or synthetic clays (e.g. hydrotalcite or laponite). In one embodiment, the high aspect filler may include organically modified montmorillonite nanoclays. The clays may be modified by substitution of the transition metal for an onium ion, as is known in the art, to provide surfactant functionality to the clay that aids in the dispersion of the clay within the generally hydrophobic polymer environment. In one embodiment, onium ions are phosphorus based (e.g. phosphonium ions) or nitrogen based (e.g. ammonium ions) and contain functional groups having from 2 to 20 carbon atoms. The clays may be provided, for example, in nanometer scale particle sizes, such as, less than 25 μm by volume. The particle size may be in a range of from 1 to 50 μm, or 1 to 30 μm, or 2 to 20 μm. In addition to silica, the nanoclays may also contain some fraction of alumina. For example, the nanoclays may contain from 0.1 to 10 Wt.-% alumina, or 0.5 to 5 Wt.-% alumina, or 1 to 3 Wt.-% alumina. Examples of commercially available organically modified nanoclays as high aspect ratio mineral fillers include, for example, those sold under the trade name Cloisite® clays 10A, 20A, 6A, 15A, 30B, or 25A.

One or more of the halogenated copolymers according to the invention or the blends with secondary rubbers and/or thermoplastic polymers or the compounds described above are hereinafter collectively referred to as polymer products and may further contain other ingredients such as curing agents, reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. These ingredients are used in conventional amounts that depend, inter alia, on the intended use.

The polymer products may further contain a curing system which allows them to be cured.

The choice of curing system suitable for use is not particularly restricted and is within the purview of a person skilled in the art. In certain embodiments, the curing system may be sulphur-based, peroxide-based, resin-based or ultraviolet (UV) light-based. sulfur-based curing system may comprise: (i) at least one metal oxide which is optional, (ii) elemental sulfur and (iii) at least one sulfur-based accelerator. The use of metal oxides as a component in the sulphur curing system is well known in the art and preferred.

A suitable metal oxide is zinc oxide, which may be used in the amount of from about 1 to about 10 phr. In another embodiment, the zinc oxide may be used in an amount of from about 2 to about 5 phr.

Elemental sulfur, is typically used in amounts of from about 0.2 to about 2 phr.

Suitable sulfur-based accelerators may be used in amounts of from about 0.5 to about 3 phr.

Non-limiting examples of useful sulfur-based accelerators include thiuram sulfides (e.g. tetramethyl thiuram disulfide (TMTD)), thiocarbamates (e.g. zinc dimethyl dithiocarbamate (ZDMC), zinc dibutyl dithiocarbamate (ZDBC), zinc dibenzyldithiocarbamate (ZBEC) and thiazyl or benzothiazyl compounds (e.g. 4-morpholinyl-2-benzothizyl disulfide (Morfax), mercaptobenzothiazol (MBT) and mercaptobenzothiazyl disulfide (MBTS)). A sulphur based accelerator of particular note is mercaptobenzothiazyl disulfide.

Depending on the specific nature an in particular the level of unsaturation of the halogenated elastomers according to the invention peroxide based curing systems may also be suitable. A peroxide-based curing system may comprises a peroxide curing agent, for example, dicumyl peroxide, di-tert-butyl peroxide, benzoyl peroxide, 2,2'-bis(tert.-butylperoxy diisopropylbenzene (Vulcup® 40KE), benzoyl peroxide, 2,5-dimethyl-2,5-di(tert-butylperoxy)-hexyne-3,2,5-dimethyl-2,5-di(benzoylperoxy)hexane, (2,5-bis(tert-butylperoxy)-2,5-dimethyl hexane and the like. One such peroxide curing agent comprises dicumyl peroxide and is commercially available under the name DiCup 40C. Peroxide curing agents may be used in an amount of about 0.2-7 phr, or about 1-6 phr, or about 4 phr. Peroxide curing co-agents may also be used. Suitable peroxide curing co-agents include, for example, triallyl isocyanurate (TAIC) commercially available under the name DIAK 7 from DuPont, N,N'-m-phenylene dimaleimide known as HVA-2 from DuPont or Dow), triallyl cyanurate (TAC) or liquid polybutadiene known as Ricon D 153 (supplied by Ricon Resins). Peroxide curing co-agents may be used in amounts equivalent to those of the peroxide curing agent, or less. The state of peroxide cured articles is enhanced with butyl polymers comprising increased levels of unsaturation, for example a multiolefin content of at least 0.5 mol-%.

The polymer products may also be cured by the resin cure system and, if required, an accelerator to activate the resin cure.

Suitable resins include but are not limited to phenolic resins, alkylphenolic resins, alkylated phenols, halogenated alkyl phenolic resins and mixtures thereof.

When used for curing butyl rubber, a halogen activator is occasionally used to effect the formation of crosslinks Such activators include stannous chloride or halogen-containing polymers such as polychloroprene. The resin cure system additionally typically includes a metal oxide such as zinc oxide.

Halogenated resins in which some of the hydroxyl groups of the methylol group are replaced with, e.g., bromine, are more reactive. With such resins the use of additional halogen activator is not required.

Illustrative of the halogenated phenol aldehyde resins are those prepared by Schenectady Chemicals, Inc. and identified as resins SP 1055 and SP 1056. The SP 1055 resin has a methylol content of about 9 to about 12.5% and a bromine content of about 4%. whereas the SP 1056 resin has a methylol content of about 7.5 to about 11% and a bromine content of about 6%. Commercial forms of the nonhalogenated resins are available such as SP-1044 with a methylol content of about 7 to about 9.5% and SP-1045 with a methylol content of about 8 to about 11%.

The selection of the various components of the resin curing system and the required amounts are known to persons skilled in the art and depend upon the desired end use of the rubber compound. The resin cure as used in the vulcanization of halogenated elastomers comprising unsaturation, and in particular for butyl rubber is described in detail in "Rubber Technology" Third Edition, Maurice Morton, ed., 1987, pages 13-14, 23, as well as in the patent literature, see, e.g., U.S. Pat. Nos. 3,287,440 and 4,059,651.

Since the aforementioned sulfur-based curing system, resin cure systems and peroxide based curing systems are particularly useful in combination with the copolymers according to the invention, the invention also encompasses the use of such cure sulfur-based curing system, resin cure systems and peroxide based curing systems and their specific components as mentioned above singly and jointly for curing compounds comprising the copolymers according to the invention.

To the extent the polymer products disclosed above whether uncure or cured exhibit the levels of salts of multivalent metal ions, in particular the levels of stearates and palmitates of multivalent metal ions with respect to their contents of the halogenated elastomers according to the invention there are as such novel and consequently encompassed by the invention as well.

The invention further encompasses the use of the halogenated elastomers according to the invention to prepare the polymer products described above and a process for the preparation of the polymer products described above by blending or compounding the ingredients mentioned above.

Such ingredients may be compounded together using conventional compounding techniques. Suitable compounding techniques include, for example, mixing the ingredients together using, for example, an internal mixer (e.g. a Banbury mixer), a miniature internal mixer (e.g. a Haake or Brabender mixer) or a two roll mill mixer. An extruder also provides good mixing, and permits shorter mixing times. It is possible to carry out the mixing in two or more stages, and the mixing can be done in different apparatuses, for example one stage in an internal mixer and one stage in an extruder. For further information on compounding techniques, see Encyclopedia of Polymer Science and Engineering, Vol. 4, p. 66 et seq. (Compounding). Other techniques, as known to those of skill in the art, are further suitable for compounding.

It was surprisingly found that the halogenated elastomers according to the invention due to their low stearate concentration allow much better curing, in particular when resin cured as will be shown in the experimental part.

Applications

The polymer products according to the invention are highly useful in wide variety of applications. The low degree of permeability to gases, the unsaturation sites which may serve as crosslinking, curing or post polymerization modification site as well as their low degree of disturbing additives accounts for the largest uses of these rubbers.

Therefore, the invention also encompasses the use of the polymer products according to the invention for innerliners, bladders, tubes, air cushions, pneumatic springs, air bellows, accumulator bags, hoses, conveyor belts and pharmaceutical closures. The invention further encompasses the aforementioned products comprising the polymer products according to the invention whether cured or/uncured.

The polymer products further exhibit high damping and have uniquely broad damping and shock absorption ranges in both temperature and frequency.

Therefore, the invention also encompasses the use of the polymer products according to the invention in automobile suspension bumpers, auto exhaust hangers, body mounts and shoe soles.

The polymer products of the instant invention are also useful in tire sidewalls and tread compounds. In sidewalls, the polymer characteristics impart good ozone resistance, crack cut growth, and appearance.

The polymer products may be shaped into a desired article prior to curing. Articles comprising the cured polymer products include, for example, belts, hoses, shoe soles, gaskets, o-rings, wires/cables, membranes, rollers, bladders (e.g. curing bladders), inner liners of tires, tire treads, shock absorbers, machinery mountings, balloons, balls, golf balls, protective clothing, medical tubing, storage tank linings, electrical insulation, bearings, pharmaceutical stoppers, adhesives, a container, such as a bottle, tote, storage tank, etc.; a container closure or lid; a seal or sealant, such as a gasket or caulking; a material handling apparatus, such as an auger or conveyor belt; power belts, a cooling tower; a metal working apparatus, or any apparatus in contact with metal working fluids; an engine component, such as fuel lines, fuel filters, fuel storage tanks, gaskets, seals, etc.; a membrane, for fluid filtration or tank sealing.

Additional examples where the polymer products may be used in articles or coatings include, but are not limited to, the following: appliances, baby products, bathroom fixtures, bathroom safety, flooring, food storage, garden, kitchen fixtures, kitchen products, office products, pet products, sealants and grouts, spas, water filtration and storage, equipment, food preparation surfaces and equipments, shopping carts, surface applications, storage containers, footwear, protective wear, sporting gear, carts, dental equipment, door knobs, clothing, telephones, toys, catheterized fluids in hospitals, surfaces of vessels and pipes, coatings, food processing, biomedical devices, filters, additives, computers, ship hulls, shower walls, tubing to minimize the problems of biofouling, pacemakers, implants, wound dressing, medical textiles, ice machines, water coolers, fruit juice dispensers, soft drink machines, piping, storage vessels, metering systems, valves, fittings, attachments, filter housings, linings, and barrier coatings.

The invention is hereinafter further explained by the examples without being limited thereto.

EXAMPLES

Materials

Commercially available reagents and solvents were used without further purification unless otherwise stated. Hexane was purchased from VWR International. Sodium hypochlorite solution was purchased from Sigma-Aldrich (11% available chlorine). Bleach used was household bleach with 4.25 wt-% sodium hypochlorite.

The following isoprene-isobutene rubbers were used as starting material:

Regular Butyl Rubber #1 (RB#1) having an isoprene content of 3.8 mol %, a Mooney viscosity [ML1+8 at 125° C., ASTM D 1646] of 36, an Mn of 169 kD and an Mw of 491 kD Regular Butyl Rubber #2 (RB#2) having an isoprene content of 1.9 mol %, a Mooney viscosity [ML1+8 at 125° C., ASTM D 1646] of 31, an Mn of 119 kD and an Mw of 496 kD All other materials were prepared by known literature procedures or are described in detail below.

Methods and Instrumentation

Reactions performed above ambient room temperature were done so in an oil bath or aluminum block heated externally by a VWR vms-c7 heating/stirring mantel equipped with a VWR temperature control. Crude reaction mixtures were analyzed by 1H NMR spectroscopy. 1H, 13C NMR spectra were recorded in CDCl3 (with TMS as a reference) on a Bruker Avance II 500 MHz spectrometer with the following notation being used: br broad, s singlet, d doublet, t triplet, q quartet, m multiplet, dd doublet of doublets. FTIR spectra were recorded on BRUKER TENSOR 27 Infra-red spectrometer. Gel Permeation Chromatographic was performed on an Alliance waters 2690/5 separation module with waters 24414 refractive index defector.

Examples 1a to 1d

Chlorination of RB#1 with Sodium Hypochlorite in Various Amounts

A 1 g portion of dry RB#1 was dissolved in 15 ml of hexane. Approximately 1 mg of BHT was added to the RB#1 solution to reduce chain-scission reactions. Various amounts of sodium hypochlorite solution (Sigma Aldrich, see above: 1a: 0.025 ml; 1b: 0.05 ml; 1c: 0.1 ml; 1d: 0.4 ml) were dissolved in 10 ml of water in a 100 ml round bottom flask. The hexane solution comprising RB#1 and BHT in hexane was added to said sodium hypochlorite solution. A 0.4 ml portion of acetic acid was added and the resulting mixture stirred in the dark for 30 minutes.

The reaction mixture was added to 50 ml acetone. The coagulated rubber was dried and analyzed using $^1$HNMR and Gel Permeation Chromatography (GPC).

Reacting different amounts of sodium hypochlorite with RB#1 allowed the synthesis of products with different chlroination levels. Analysis of the $^1$H NMR spectra of the product confirmed the formation of chlorobutyl rubber. The exo-CH2-contents versus the amount of sodium hypochlorite solution employed are shown in FIG. 1

Example 2

Chlorination of RB#1 with Sodium Hypochlorite

A 100 g portion of dry RB#1 was dissolved in 1000 ml of hexane. Approximately 100 mg of BHT was added to the RB#1 solution to reduce chain-scission reactions. 100 ml of water (10%) was added to the solution and mixed for 2 minutes. Sodium hypochlorite solution (Sigma Aldrich, see above) 10 ml was added followed by 9.5 ml of acetic acid. The solution mixture was stirred exposed to light for 20 minutes. 12 ml of 10 wt-% NaOH was added to the reaction and washed several times with water. The pH of the water waste was around 6. The rubber was steam coagulated and dried. The resulting product was analyzed using $^1$HNMR and GPC.

Example 3

Chlorination of RB#1 with Household Bleach

A 1 g portion of dry RB#1 was dissolved in 15 ml of hexane. Approximately 1 mg of BHT was added to the RB#1 solution to reduce chain-scission reactions, household bleach 1.2 ml was dissolved in 10 ml of water in a 100 ml round bottom flask. The hexane solution comprising RB#1 and BHT in hexane was added to the bleach solution. A 0.4 ml portion of acetic acid was added and stirred in the dark for 30 minutes. The reaction mixture was added to 50 ml acetone. The coagulated rubber was dried and analyzed using $^1$HNMR and GPC.

Example 4

Chlorination of (Sigma Aldrich, See Above) with Sodium Hypochlorite

A 1 g portion of dry RB#2 was dissolved in 15 ml of hexane. Approximately 1 mg of BHT was added to the RB#2 solution to reduce chain-scission reactions, Sodium hypochlorite solution (Sigma-Aldrich, see above) 0.19 ml was dissolved in 10 ml of water in a 100 ml round bottom flask. The hexane solution comprising RB#2 and BHT was added to the Sodium hypochlorite solution. A 0.2 ml portion of acetic acid was added and stirred for 30 minutes. The reaction mixture was added to 50 ml acetone. The coagulated rubber was dried and analyzed using $^1$HNMR and GPC.

Example 5

Chlorination of Sodium Hypochlorite with Sodium Hypochlorite

A 250 g portion of dry RB#2 was dissolved in 2500 ml of hexane. Approximately 100 mg of BHT was added to the RB#2 solution to reduce chain-scission reactions. 100 ml of water (10%) was added to the solution and mixed for 2 minutes. (Sigma-Aldrich, see above) 10 ml was added followed by 9.5 ml of acetic acid. The solution mixture was stirred exposed to light for 20 minutes. 12 ml of 10 wt-% NaOH was added to the reaction and washed several times with water. The pH of the water waste was around 6. The rubber was steam coagulated and dried. The resulting product was analyzed using $^1$HNMR and GPC.

Results

An analysis of the $^1$H NMR spectra of the chlorinated rubber via the halogenation process according to the invention was performed. It could be shown that in all examples 2 to 5 chlorinated butyl rubber was obtained in high yield.

What is claimed is:

1. A process for the preparation of a chlorinated copolymer comprising at least the steps of:
    polymerizing a copolymer from a reaction medium comprising:
        an aliphatic medium including at least 50 weight percent of one or more aliphatic hydrocarbons, and
        a monomer mixture comprising at least one isoolefin monomer and at least one multiolefin monomer,
        in the presence of an initiator to form a product comprising the copolymer, the aliphatic medium, and residual monomers of the monomer mixture;
    removing the residual monomer to obtain an organic phase comprising the copolymer and the aliphatic medium;
    contacting the organic phase with hypochloric acid, dichlorine oxide, or an aqueous phase containing hypochloric acid or dichlorine oxide; and
    reacting the copolymer in the organic phase
    with hypochloric acid and or dichlorine oxide.

2. The process according to claim 1, wherein the isoolefin monomer is selected from those having from 4 to 16 carbon atoms.

3. The process according to claim 1, wherein the isoolefin monomer is isobutene.

4. The process according to claim 1, wherein the multiolefin is selected from the group consisting of isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene and 1-vinyl-cyclohexadiene.

5. The process according to claim 1, wherein the multiolefin is isoprene.

6. The process according to claim 4, wherein the copolymers further comprise further structural units derived from olefins selected from the group consisting of β-pinene, styrene, divinylbenzene, diisopropenylbenzene, and o-, m- and p-alkylstyrenes.

7. The process according to claim 1, wherein the reacting includes a chlorination reaction and is carried out by contacting the aqueous phase with the organic.

8. The process according to claim 1, wherein hypochloric acid and/or dichlorine oxide are prepared by reacting one or more hypochlorites with acidic compounds having a pKa of 0.00 to 7.60, as measured at standard conditions.

9. The process according claim 8, wherein the acidic compounds are carboxylic acids.

10. The process according to claim 8, wherein the one or more hypochlorites is sodium hypochlorite.

11. The process according to claim 7, wherein the aqueous phase comprising hypochloric acid and/or dichlorine oxide exhibits a pH value of from 2.0 to 7.4 under reaction conditions.

12. The process of claim 1,
    wherein the reaction is carried out in the presence of an antioxidant.

13. The process of claim 1, wherein the isoolefin monomer is selected from those having 4 to 7 carbon atoms.

14. The process of claim 1, wherein the isoolefin monomer is selected from the group consisting of isobutene, 2-methyl-1-butene, 3-methyl-1-butene, and 2-methyl-2-butene.

15. A process for the preparation of a chlorinated copolymer comprising at least the step of reacting a copolymer comprising
    i) structural units derived from at least one isoolefin monomer and
    ii) structural units derived from at least one multiolefin monomer with hypochloric acid and or dichlorine oxide;
    wherein the chlorinated copolymer has a chlorine content from 0.1 to 4 wt.-%,
    wherein the structural units derived from isoprene are at least partially chlorinated to form exo-methylene and endo-Cl and cis-endo and trans-endo and microstructure units such that the microstructure Index X being the ratio of mol-% (exo-methylene+endo-Cl)/mol-% (cis-endo and trans-endo) as measured by 1H-NMR is from 1.50 to 3.30.

16. The process of claim 15, wherein the chlorine content of the copolymer is from 1.1 to 2.2 wt.-%, and the microstructure Index X is from 2.20 to 2.80.

17. A process for the preparation of a chlorinated copolymer comprising at least the step of reacting a copolymer comprising
    i) structural units derived from at least one isoolefin monomer and
    ii) structural units derived from at least one multiolefin monomer
    with hypochloric acid and or dichlorine oxide;
    wherein the multi-olefin includes isoprene;
    wherein the chlorinated copolymer comprises 1-(1-chloromethylethenyl)-2,2,4,4-tetramethylcyclohexane (C1-C13) and 1,1,5,5-tetramethyl-2-(1-chloromethylethenyl)-3-(2,2,4-trimethylpentyl)-cyclohexane (C1-C21) in a ratio (C1-C13)/(C1-C21) of 0.60 or more.

18. A process for the preparation of a chlorinated copolymer comprising at least the steps of:
    polymerizing a copolymer from a reaction medium comprising:
        an aliphatic medium including at least 50 weight percent of one or more aliphatic hydrocarbons, and
        a monomer mixture comprising at least one isoolefin monomer and at least one multiolefin monomer, in the presence of an initiator to form a product comprising the copolymer, the aliphatic medium, and residual monomers of the monomer mixture;

removing the residual monomer to obtain an organic phase;

contacting the organic phase with hypochloric acid, dichlorine oxide, or an aqueous phase containing hypochloric acid or dichlorine oxide; and reacting the copolymer in the organic phase with hypochloric acid and or dichlorine oxide;

wherein the chlorinated copolymer comprises 1-(1-chloromethylethenyl)-2,2,4,4-tetramethylcyclohexane (C1-C13) and 1,1,5,5-tetramethyl-2-(1-chloromethylethenyl)-3-(2,2,4-trimethylpentyl)-cyclohexane (C1-C21) in a ratio (C1-C13)/(C1-C21) of 1.50 to 5.00.

19. A process for the preparation of a chlorinated copolymer comprising at least the step of reacting a copolymer comprising
  i) structural units derived from at least one isoolefin monomer and
  ii) structural units derived from at least one multiolefin monomer
  with dichlorine oxide;
  wherein the chlorinated copolymer comprises 1-(1-chloromethylethenyl)-2,2,4,4-tetramethylcyclohexane (C1-C13) and 1,1,5,5-tetramethyl-2-(1-chloromethylethenyl)-3-(2,2,4-trimethylpentyl)-cyclohexane (C1-C21) in a ratio (C1-C13)/(C1-C21) of 0.60 or more.

20. The process of claim 15, wherein the reaction is carried out by contacting an aqueous phase comprising hypochloric acid and/or dichlorine oxide with an organic phase comprising the copolymer and an organic diluent wherein the organic diluent is hexane.

21. The process of claim 15, wherein the isoolefin monomer is selected from those having from 4 to 16 carbon atoms, optionally wherein the isoolefin monomer is isobutene.

22. The process of claim 15, wherein the multiolefin monomer is selected from the group consisting of isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene and 1-vinyl-cyclohexadiene.

23. The process of claim 15,
  wherein the method includes preparing the hypochloric acid and/or dichlorine oxide by reacting hypochlorites with acidic compounds having a pKa of 0.00 to 7.60 as measured at standard conditions;
  optionally, wherein the acidic compounds are carboxylic acids;
  optionally, wherein the hypochlorite is sodium hypochlorite;
  optionally, wherein an aqueous phase comprising hypochloric acid and/or dichlorine oxide exhibits a pH value of from 2.0 to 7.4 under reaction conditions.

24. The process of claim 16, wherein
  the multiolefin monomer includes isoprene;
  wherein the method includes preparing the hypochloric acid and/or dichlorine oxide by reacting sodium hypochlorite with one or more carboxylic acids;
  optionally, wherein the step of reacting the copolymer is carried out in the presence of antioxidant;
  optionally, wherein the isoolefin monomer includes isobutene;
  optionally, wherein the copolymer comprises 1-(1-chloromethylethenyl)-2,2,4,4-tetramethylcyclohexane (C1-C13) and 1,1,5,5-tetramethyl-2-(1-chloromethylethenyl)-3-(2,2,4-trimethylpentyl)-cyclohexane (C1-C21) in an amount of together 1000 ppm or less and/or in a ratio (C1-C13) / (C1-C21) of 0.60 or more.

* * * * *